(12) United States Patent
Hogle et al.

(10) Patent No.: US 6,887,004 B1
(45) Date of Patent: May 3, 2005

(54) KEYBOARD SUPPORT PLATFORM

(75) Inventors: Glenn Hogle, La Mesa, CA (US); Michael Roeder, San Diego, CA (US); Sherri Hogle, La Mesa, CA (US)

(73) Assignee: Active Input Solutions, LLC, San Diego, CA (US)

( * ) Notice: Subject to any disclaimer, the term of this patent is extended or adjusted under 35 U.S.C. 154(b) by 108 days.

(21) Appl. No.: 09/883,867

(22) Filed: Jun. 18, 2001

Related U.S. Application Data

(63) Continuation-in-part of application No. 09/521,581, filed on Mar. 9, 2000, now Pat. No. 6,579,022.

(51) Int. Cl.[7] .................................. B41J 29/02
(52) U.S. Cl. ...................... 400/691; 400/679
(58) Field of Search .................. 400/691, 693, 400/682, 679, 472; 341/22; 248/118.3, 118.1, 919

(56) References Cited

U.S. PATENT DOCUMENTS

| | | | |
|---|---|---|---|
| 4,225,988 A | 10/1980 | Cary et al. ................... 5/61 |
| 4,658,268 A * | 4/1987 | Needham ..................... 347/7 |
| 5,238,001 A * | 8/1993 | Gallant et al. ............. 600/513 |
| 5,541,593 A | 7/1996 | Arsem ........................ 341/22 |
| 5,564,844 A | 10/1996 | Patterson, Jr. et al. ...... 400/492 |
| 5,601,264 A * | 2/1997 | Peart ....................... 248/118.1 |
| 5,616,897 A * | 4/1997 | Weber et al. ............... 200/5 A |
| 5,742,242 A * | 4/1998 | Sellers ....................... 341/22 |
| 5,806,115 A | 9/1998 | Brown ......................... 5/615 |
| 5,828,034 A * | 10/1998 | Chang ....................... 219/209 |
| 5,951,179 A | 9/1999 | Zarek ........................ 400/492 |
| 6,036,271 A | 3/2000 | Wilkinson et al. ....... 297/452.41 |
| 6,161,806 A | 12/2000 | Crosson ................... 248/118.3 |
| 6,256,018 B1 | 7/2001 | Zarek ........................ 345/168 |
| 6,366,617 B1 * | 4/2002 | Ryan ..................... 375/240.25 |
| 6,409,127 B1 * | 6/2002 | VanderHeide et al. ....... 248/118 |

* cited by examiner

*Primary Examiner*—Anthony H. Nguyen
(74) *Attorney, Agent, or Firm*—John L. Rogitz

(57) ABSTRACT

A keyboard support platform includes a lower plate and an upper plate connected thereto. A bladder is disposed between the upper plate and the lower plate. The bladder is inflatable and deflatable to pivot the upper plate with respect to the lower plate. The keyboard support platform can be attached to an articulated arm that extends from a desk. A keyboard, a mouse, or both can be placed on the support platform. While using the keyboard or mouse that is placed on the support platform, a user must follow the cyclical motion of the support platform. This slight motion causes the user's hands and wrists to move which reduces the risk of developing Carpal Tunnel Syndrome.

22 Claims, 5 Drawing Sheets

KEYBOARD SUPPORT PLATFORM

RELATED APPLICATIONS

The present application is a continuation-in-part of U.S. patent application Ser. No. 09/521,581, filed Mar. 9, 2000, now U.S. Pat. No. 6,579,022 and claims priority therefrom.

TECHNICAL FIELD

The present invention relates to computer keyboard support structures.

BACKGROUND OF THE INVENTION

With increased computer usage in the home and office, a very common injury is repetitive stress injury, including Carpal Tunnel Syndrome (CTS). A major cause of CTS is repetitive motion, e.g., typing at a computer for an extended period of time. During the act of typing, the flexor tendons leading from the forearm to the thumb and fingers rub against the interior wall of the carpal tunnel. Without breaks in the movement or changing wrist position, tendons become inflamed due to an increase in intracarpal pressure (ICP) which, in turn, leads to a lack of proper blood flow. If the tendons in the carpal tunnel become inflamed, pressure may be put on the medial nerve at the wrist thereby causing pain, numbness, tingling, and weakness in the thumb and fingers.

CTS caused by typing can be prevented with proper posture, proper typing technique, proper equipment set up, and exercise. Not surprisingly, devices have been introduced to minimize the risk of developing CTS from typing. One such device is disclosed by U.S. Pat. No. 5,564,844 (the "'844 patent"), which discloses a cam-driven platform onto which a keyboard is placed. The platform is hinged to a base plate, and a motorized cam moves the platform from a horizontal position to an angled position above horizontal. The '844 patent is designed to minimize the possibility of developing CTS by preventing the wrist from remaining in the same position for an extended period of time while typing. Unfortunately, the cam is a solid piece that does not provide any shock absorption or cushion as a user types on a keyboard placed on the platform. The lack of cushioned support provided by the '844 patent can also lead to CTS.

The present invention has recognized these prior art drawbacks, and has provided the below-disclosed solutions to one or more of the prior art deficiencies.

SUMMARY OF THE INVENTION

A workstation includes a desk that has an articulated arm. A cyclically movable support platform is attached to the articulated arm. Preferably, the support platform includes an upper plate that is movably attached to a lower plate. The upper plate is movable with respect to the lower plate between a raised position and a lowered position.

In a preferred embodiment, an inflatable bladder is disposed between the upper plate and the lower plate. The bladder is inflatable and deflatable to move the upper plate with respect to the lower plate. In a particularly preferred embodiment, the upper plate is rotatably attached to the lower plate by a pivot located anywhere between a front edge of the support platform and a rear edge of the support platform. To provide for inflating and deflating the bladder, a pump and a bleed orifice are in fluid communication with the bladder. Moreover, a controller is electrically connected to the pump. The controller periodically energizes and de-energizes the pump.

As contemplated herein, the support platform can be laterally movable with respect to the desk. Also, an adapter plate can be disposed between the support platform and the articulated arm. In a preferred embodiment, the workstation further includes a computer disposed on the desk and a keyboard disposed on the support platform. A mouse also can be disposed on the support platform adjacent to the keyboard.

In another aspect of the present invention, a support platform includes a lower plate and an upper plate that is movably attached to the lower plate. A bladder is disposed between the upper plate and the lower plate. In this aspect, the bladder is inflatable and deflatable in order to move the upper plate with respect to the lower plate.

In yet another aspect of the present invention, a system for reducing repetitive stress injury caused by typing includes a desk and an articulated arm that extends from the desk. A cyclically movable platform is attached to the articulated arm, and a keyboard is disposed on the support platform.

The present invention will now be described, by way of example, with reference to the accompanying drawings, in which:

DESCRIPTION OF AN EMBODIMENT OF THE INVENTION

Figure 1:
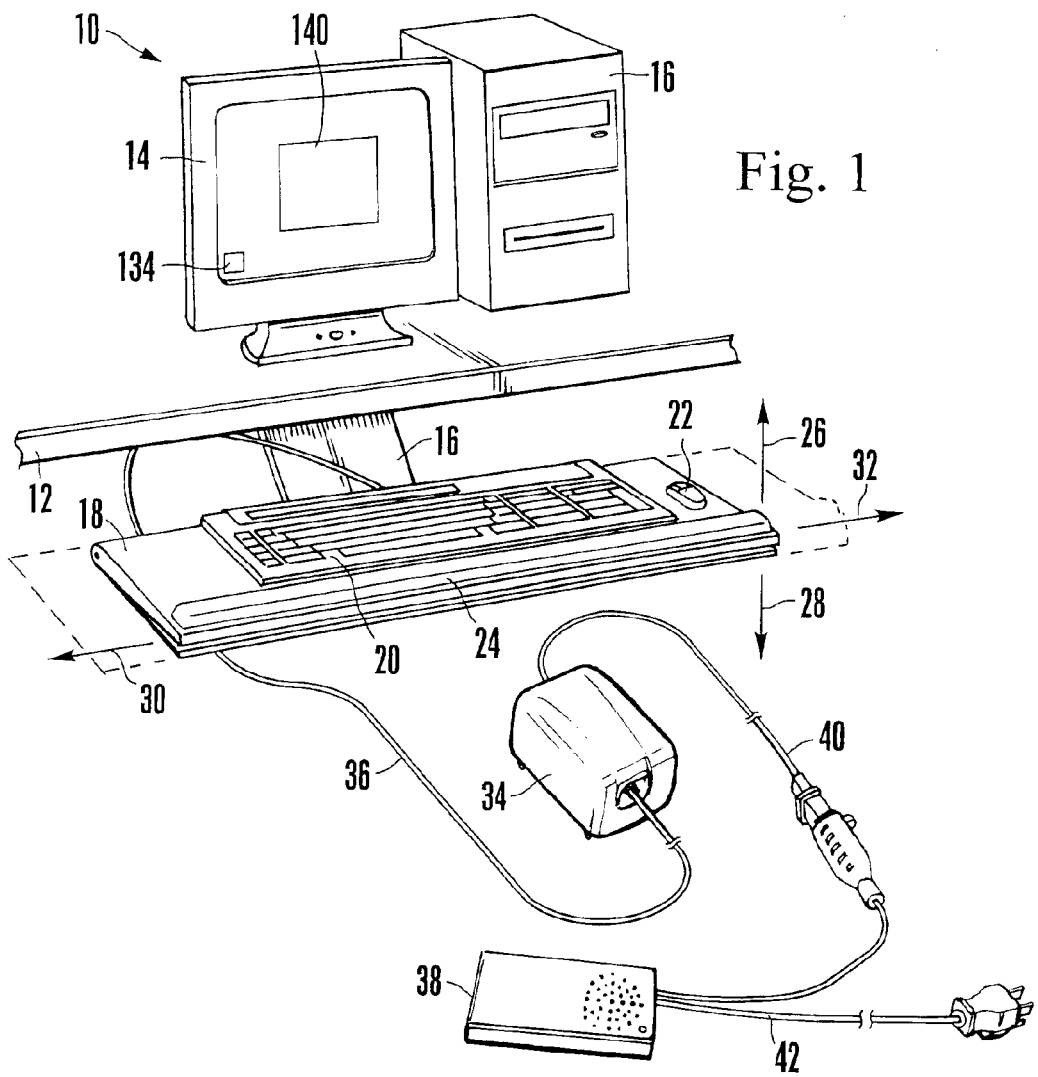
FIG. 1 is a perspective view of a workstation.

Referring initially to FIG. 1, a workstation is shown and generally designated 10. FIG. 1 shows that the workstation 10 can include a desk 12 on which a computer monitor 14 and a computer central processing unit (CPU) 16 can be disposed. An articulated arm 16 can extend from the underside of the desk 12 and a keyboard support platform 18 is attached to the end of the arm 16. As shown, a computer keyboard 20 and/or a computer mouse 22 can be supported on top of the keyboard support platform 18. Also, a cushioned pad 24 can be placed in front of the keyboard 20 and mouse 22. It is to be appreciated that the keyboard support platform 18 can be sized and shaped to support a keyboard 20 only, a mouse 22 only, or both as shown.

As indicated by arrows 26 and 28 in FIG. 1, the articulated arm 16 allows the keyboard support platform 18 to be adjusted up or down depending, e.g., on the height of the user. Also, as described in detail below and indicated by arrows 30 and 32 in FIG. 1, the articulated arm 16 allows the keyboard support platform 18 to move laterally with respect to the desk and the user. Thus, the user can shuttle the keyboard support platform 18 to the right or left in order to position the mouse directly in front of the user's shoulder during periods of extended mouse usage, e.g., when using computer-aided-drafting software (CAD).

Figure 2:
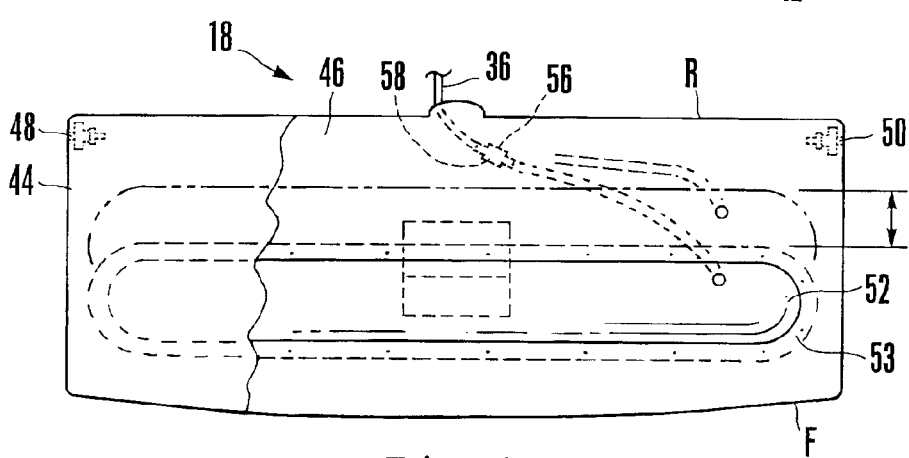
FIG. 2 is a top plan view of a keyboard support platform with portions of the upper plate broken away for clarity.

As further shown in FIG. 1, a pump 34 is connected to the keyboard support platform 18 by fluid line 36. A controller 38 is connected to the pump 34 by electrical line 40. The controller 38, in turn, can be plugged into a standard one-hundred and ten volt (110V) electrical outlet by a power cord 42. It is to be understood that the controller 38 controls when and how long the pump 34 operates. It is to be appreciated that both the controller 38 and pump 34 can be disposed within a single housing that is external to the keyboard support platform 18. Alternatively, the controller 38 and pump 34 can be located within the keyboard support platform 18, between the below-described upper plate 44 and lower plate 46 (FIG. 2). Or, the controller 38 and pump 34 can be located within the CPU 16.

Figure 3A:
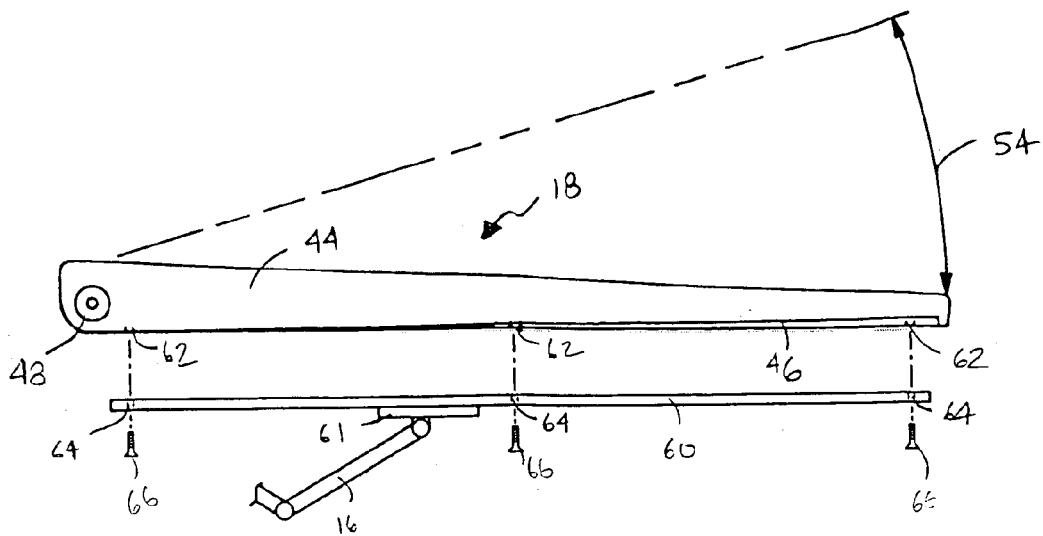
FIG. 3a is side plan view of the keyboard support platform connected to an articulated arm.

Referring now to FIGS. 2 and 3a, details concerning the construction of the keyboard support platform 18 and its connection to the articulated arm 16 are shown. FIGS. 2 and 3a show that the keyboard support platform 18 includes a rigid metal or plastic generally parallelepiped-shaped upper plate 44 and a lower plate 46 configured complementarily to the upper plate 44. The upper plate 44 is rotatably connected to the lower plate 46 by a first pivot pin or shaft 48 and a second pivot pin or shaft 50. In lieu of the pivots 48, 50, a hinge can be used. As shown, an inflatable air bladder 52 is disposed between the plates 44, 46. In one exemplary embodiment, the bladder 52 includes an external flap (not shown) that is sandwiched between the bottom plate 46 and an elongated racetrack-shaped ring 53. The ring 53 seals the bladder 52 and holds it in place on the bottom plate 46. Alternatively, the flat formed by the bladder 52 can be glued or otherwise attached to the bottom plate 46.

Preferably, the bladder 52 is manufactured from non-stretch plastic. Also, in a preferred embodiment the bladder 52 is generally tube shaped. It is to be appreciated that the bladder 52 can have a single chamber or multiple chambers. FIG. 2 shows that the fluid line 36 is connected to the bladder 52 and when the pump 34 is energized, the bladder 52 is inflated. As the bladder 52 inflates, it lifts the upper plate 44 and causes it to pivot away from the lower plate 46 about the pivots 48, 50. This motion of the upper plate 44 is shown in FIG. 3a by arc 54.

FIG. 2 further shows a fitting 56 installed along fluid line 36 in fluid communication with the interior of the line 36. The fitting 56 is formed with a relatively small lateral outlet orifice 58 that allows air to bleed from the bladder 52. Preferably, the orifice 58 has a constant diameter, but it is to be appreciated that an adjustable bleed orifice can be used. In any case, owing to the orifice 58, when the pump is off, the bladder 52 deflates, and the upper plate 44 consequently rotates toward the lower plate 46. The size of the orifice 58 is small enough, however, that the bladder 52 inflates when the pump 34 is on, i.e., the air flow rate pumped into the bladder 52 by the pump 34 exceeds the flow rate out of the orifice 58.

As shown in FIG. 2, the bladder 52 can be movably disposed within the keyboard support platform 18 so that the bladder 52 can be moved toward the front or rear of the keyboard support platform 18. For example, the bladder 52 can be attached in the same manner as described above to an interior plate (not shown) that is slidable relative to the lower plate 46. By moving the bladder 52 forward or backward within the keyboard support platform 18, the distance through which the upper plate 44 moves with respect to the lower plate 46 can be increased or decreased. It is to be understood that the bladder 52 not only moves the upper plate 44 as described above, but it also provides a cushioned support that provides shock absorption for the user's hands and wrists while he or she is working. Preferably, for firmer support the bladder 52 is disposed closer to the front edge F of the keyboard support platform than to the rear edge R.

FIG. 3a further shows a connecting plate 60 attached to the end of the articulated arm 16 by a lateral slider 61, the details of which are set forth further below. The lower plate 46 of the keyboard support platform 18 is formed with plural threaded holes 62 and the connecting plate 60 is formed with plural smooth-bore holes 64 that are aligned with the threaded holes 62. Threaded fasteners 66 are inserted through the smooth-bore holes 64 and threaded into the threaded holes 62. The fasteners 66 are tightened to the hold the connecting plate 60 snugly against the bottom plate 46 of the keyboard support platform 18.

Figure 3B:
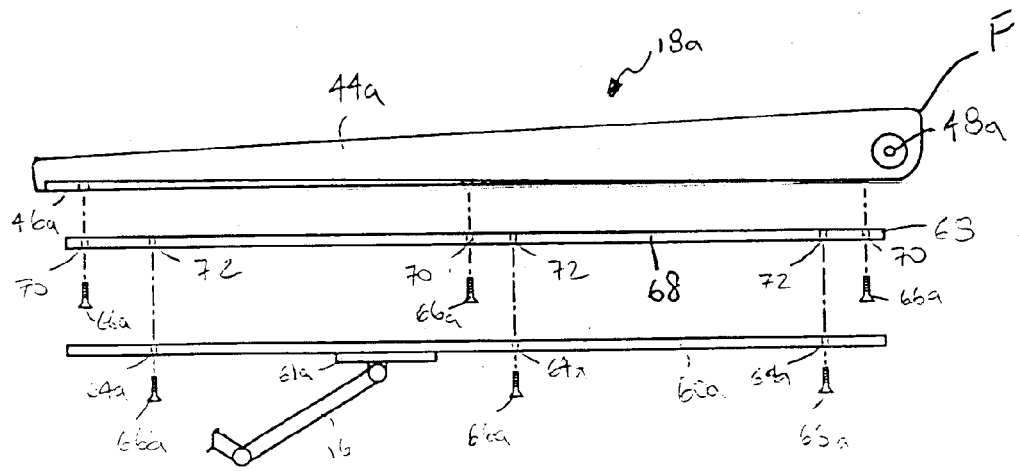
FIG. 3b is side plan view of an alternative keyboard support platform showing an adapter plate between the keyboard support platform and an articulated arm.

Referring now to FIG. 3b, an alternative keyboard support platform is shown and designated 18a. As shown, a pivot pin or shaft 48a is located toward the front edge F of the platform 18a. Additionally, an alternative means for connecting the keyboard support platform 18a to the articulated arm 16a is shown. More specifically, FIG. 3b shows an articulated arm 16a having a connecting plate 60a attached thereto by a lateral slider 61a. An adapter plate 68 formed with plural smooth-bore holes 70 and plural threaded holes 72 is attached to the bottom plate 46a of the keyboard support platform 18a with multiple fasteners 66a. In turn, the connecting plate 60a is attached to the adapter plate 68 with multiple fasteners 66a. The adapter plate 68 allows the keyboard support platform 18a to be attached to different connecting plates 60a having different threaded screw hole patterns. Also, the adapter plate 68 not the bottom plate 46a, can be formed with relatively many threaded holes 72 establishing many different patterns compatible with many different connecting plates 16a.

Figure 4:
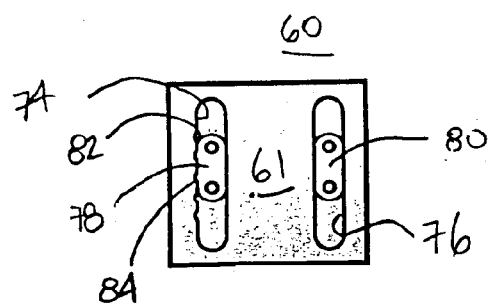
FIG. 4 is a bottom plan view of the connection between a lateral slider and a connecting plate.

FIG. 4 shows the details of the connection between the lateral slider 61 and the connecting plate 60 described above. FIG. 4 shows that the lateral slider 61 is formed with a first elongated slot 74 and a second elongated slot 76 parallel to the first slot 74. A first elliptical peg 78 and a second elliptical peg 80 are attached to the bottom of the connecting plate 60 and extend into to the first slot 74 and second slot 76, respectively. As shown, the first slot 74 is formed with plural grooves 82 and the first peg 78 is formed with corresponding protrusions 84 that fit into the grooves 82. The grooves 82 and protrusions 84 cooperate to selectively hold the connecting plate 60 in the static positions defined by the grooves and allow the connecting plate 60 and keyboard support platform 18 to move laterally as described above. A user can overcome the interlocking of the groove 82 and protrusions 84 to move the protrusions 84 into the next groove 82.

Figure 5:
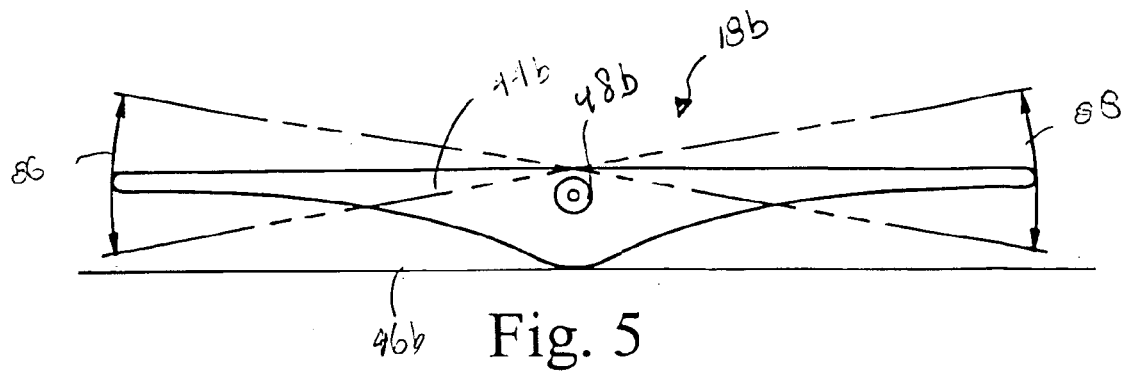
FIG. 5 is a side plan view of a second alternative keyboard support platform.

Referring now to FIG. 5, a second alternative embodiment of the keyboard support platform is shown and generally designated 18b. FIG. 5 shows that the platform 18b includes an upper plate 44b and a lower plate 46b each formed with an enlarged middle portion. As shown in FIG. 5, the upper plate 44b is attached to the lower plate 46b by a pivot pin or shaft 48b that is located in the center of the platform 18b, i.e., within the enlarged middle portions of the plates 44b, 46b. Thus, as the bladder (not shown in FIG. 5) inflates and deflates, as described above, the upper plate 44b rocks back and forth on the lower plate 46b as indicated by arc 86 and arc 88. It is to be understood that two bladders can be used, i.e., one on each side of the pivot 48b. Thus, as one bladder inflates, the other deflates and provides a cushioned support. On the other hand a return spring (not shown) can be placed opposite to a single bladder in order to provide support while the bladder is inflating or deflating.

Figure 6:
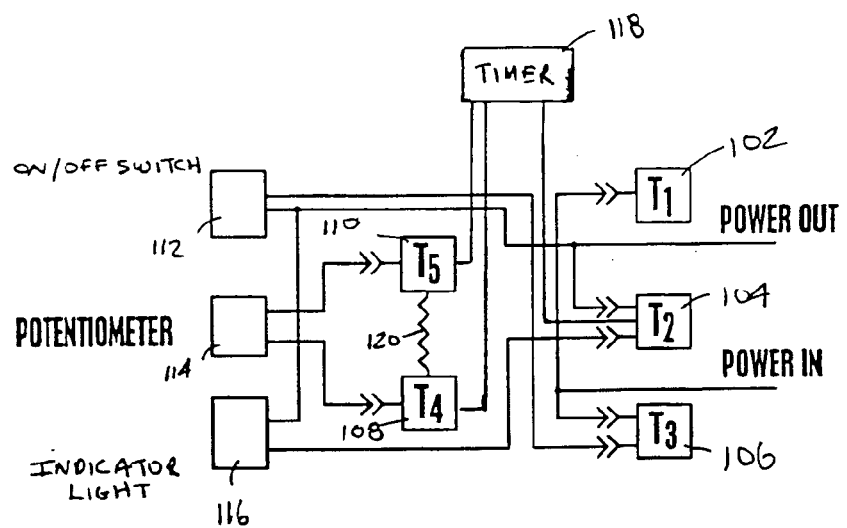
FIG. 6 is an electrical schematic diagram of the control circuit for the air pump.

FIG. 6 shows a preferred, non-limiting control circuit useful for controlling the inflation and deflation of the bladder 52 described above. As shown in FIG. 6, the control circuit includes a first terminal 102, a second terminal 104, a third terminal 106, a fourth terminal 108, and a fifth terminal 110. Moreover, the control circuit includes a switch 112, a potentiometer 114, an indicator light 116, and a timer 118. FIG. 6 shows that the power in is connected to the first and third terminals 102, 106. The third terminal 106 is connected to the switch 112. In turn, the switch 112 is connected to the indicator light 116 and the second terminal 104. As shown, the indicator light 116 is also connected to the second terminal 104. The potentiometer 114 is connected to the fourth and fifth terminals 108, 110 which are connected together by a resistor 120. The fourth and fifth terminals 108, 110 are also connected to a timer 118 that, in turn, is connected to the second terminal 104. The power out is connected to the pump 34.

When the switch 112 is turned on, the indicator light 116 is illuminated. By rotating the potentiometer 114 from a minimum setting to a maximum setting, the timer 118 will energize the pump 34 for a predetermined range of time values, e.g., zero seconds to ninety seconds, and then de-energize the pump 34 for an equal amount of time. It is to be understood the maximum setting on the potentiometer 114 corresponds to one hundred percent (100%) bladder inflation. Thus, the range of motion of the upper plate 44 can be established by adjusting the potentiometer 114. Also, the cyclical inflation/deflation of the bladder 52 causes the upper plate 44 to move back and forth. As a user types, he or she must follow the motion of the upper plate 44.

In lieu of a potentiometer, an alternative embodiment can use a multi-position switch that selectively connects one of a plurality of flashers, each with a respective time delay, to energize the pump for a respective predetermined period and, hence, cause the platform to rise a respective predetermined distance.

Figure 7:
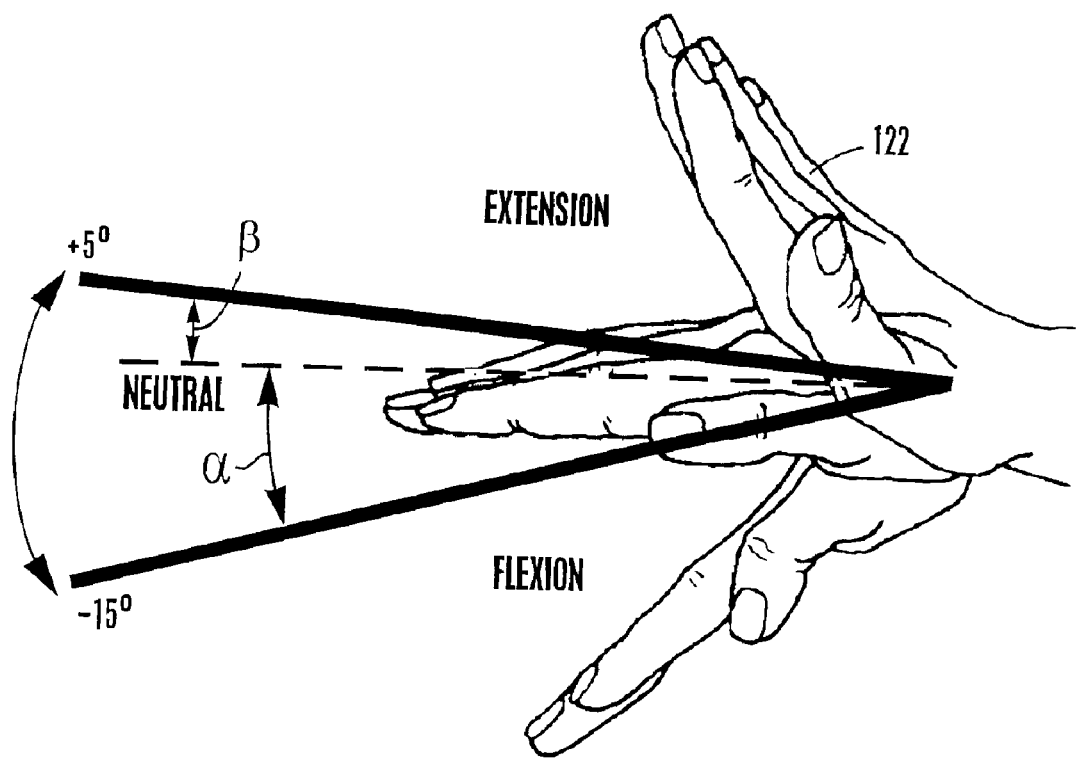
FIG. 7 is a side view of a user's hand showing the motion of the hand as the user follows the motion of the keyboard support platform while typing.

As shown in FIG. 7, the cyclical motion of the upper plate 44 causes a user's hand 122 to move back and forth through a horizontal plane between a point of flexion at an angle, a, that is approximately fifteen degrees (15°) below horizontal and a point of extension approximately at an angle, β, that is approximately five degrees (5°) above horizontal, i.e., the user's wrist moves within the neutral zone while he or she is typing. Thus, the position of the user's wrist changes continuously and the risk of developing Carpal Tunnel Syndrome is reduced.

It is to be appreciated that the keyboard support platforms 18a, 18b, 18c may be manufactured from injected molded plastic, stamped aluminum, stamped steel, or any other material with similar characteristics well known in the art. Moreover, although air is the preferred fluid for inflating the bladder, any fluid, gas or liquid, may be used. It is also to be appreciated that the keyboard support platforms 18a, 18b, 18c are not limited to the use of supporting a computer keyboard 20 and mouse 22. It may be used to support adding machines, calculators, synthesizers, or any other type of device wherein the user may derive a benefit from the continuous changing of the position of the wrist in order to minimize the risk of developing Carpal Tunnel Syndrome.

Figures 8, 9:
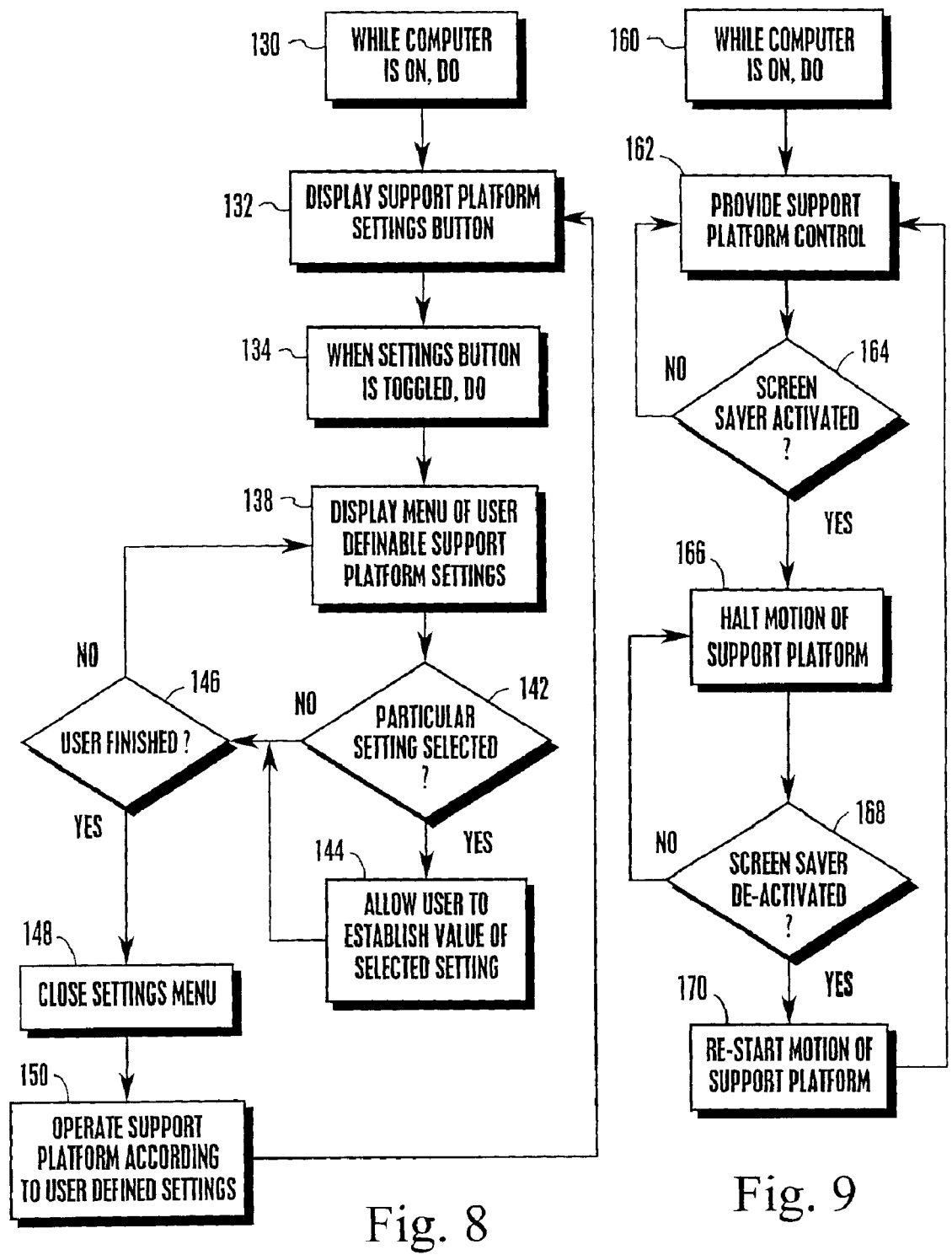
FIG. 8 is a flow chart showing the set up logic of the present invention.
FIG. 9 is a flow chart showing the operating logic of the present invention.

Referring now to FIG. 8, the set up logic of the present invention is shown and commences at block 130 with a do loop wherein while the computer 16 is on, the succeeding steps are performed. At block 132, a keyboard support platform settings button 134 (FIG. 1) is displayed. Next, at block 136, when the settings button 134 is toggled, an internal do loop is entered wherein the following steps are performed. Moving to block 138, a menu of user definable keyboard support platform settings 140 (FIG. 1) is displayed. It is to be understood that these settings include, but are not limited to, the following: inflation time, deflation time, distance up, distance down, total range of motion, static time at the top of the motion, static time at the bottom of the motion, and static time at the middle of the motion.

At decision diamond 142, it is determined whether a particular setting is selected. If so, the logic moves to block 144 and the user is allowed to establish the value of the selected setting. If not, the logic moves to decision diamond 146 where it is determined whether the user is finished defining the settings. If not, the logic returns to block 138 where the menu 140 continues to be displayed. When the user is finished defining the settings, the logic moves to block 148 where the settings menu 140 is closed. The logic then proceeds to block 150 where the keyboard support platform is operated according to the user defined settings. Returning to block 132, the keyboard support platform settings button remains displayed while the computer is on, should the user decide to change settings.

FIG. 9 shows the operating logic of the present invention. Commencing at block 160, a do loop is entered. At block 162, keyboard support platform control parameters are set up in accordance with the logic described in conjunction with FIG. 8. Then, at decision diamond 164, it is determined whether the screen saver is activated. If not, the logic returns to block 162 where the control of the keyboard support platform continues to be provided. If the screen saver is activated, the logic proceeds to block 166 where the motion of the keyboard support platform is halted, e.g., by de-energizing the pump 34.

Next, the logic moves to decision diamond 168 where it is determined whether the screen saver is deactivated. If so, the motion of the keyboard support platform is re-started, e.g., by energizing the pump 34. The logic then returns to block 162 where control of the keyboard support platform continues to be provided. If at decision diamond 168 the screen saver remains activated, the logic returns to block 166 where the motion of the keyboard support platform remains halted.

In another embodiment, instead of using the screen saver feature, a pressure sensor can be provided in, e.g., the pad 24 (FIG. 1). When a user activates the sensor, the negative branch at decision diamond 164 is followed (i.e., the keyboard support platform is moved), whereas when the sensor is not activated, the cycling of the keyboard platform is halted. Likewise, when the sensor is activated, at decision diamond 168 the pump is reactivated.

Preferably, the logic steps described above are executed by a digital processor, such as by the CPU 16. Or, the steps can be executed by any computer, including a Unix computer, or OS/2 server, or Windows NT server, or a laptop computer. These instructions may reside, for example, in RAM of the CPU 16.

Alternatively, the instructions may be contained on a data storage device with a computer readable medium, such as a computer diskette. Or, the instructions may be stored on a magnetic tape, conventional hard disk drive, electronic read-only memory, optical storage device, or other appropriate data storage device. In an illustrative embodiment of the invention, the computer-executable instructions may be lines of compiled C++ compatible code.

The flow charts herein illustrate the structure of the logic of the present invention as embodied in computer program software. Those skilled in the art will appreciate that the flow charts illustrate the structures of computer program code elements including logic circuits on an integrated circuit, that function according to this invention. Manifestly, the invention is practiced in its essential embodiment by a machine component that renders the program elements in a form that instructs a digital processing apparatus (that is, a computer) to perform a sequence of function steps corresponding to those shown.

With the configuration of structure described above, it is to be appreciated that the keyboard support platforms 18a, 18b, 18c provide a support device that can be used to support a computer keyboard 20, a computer mouse 22, or both, and slowly change the position of the keyboard 20 so that the user will have to follow the keyboard 20 while typing. Accordingly, the position of the user's wrist will change continuously and reduce the risk of developing Carpal Tunnel Syndrome. Moreover, the fluid filled bladder acts as a shock absorber for the user's hands and wrists.

While the particular KEYBOARD SUPPORT PLATFORM as herein shown and described in detail is fully capable of attaining the above-described objects of the invention, it is to be understood that it is the presently preferred embodiment of the present invention and thus, is representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." For example, while the preferred keyboard support plate moves through the horizontal, the pivot arm structure disclosed herein can be used on support plates that do not move through the horizontal. All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it is to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. section 112, sixth paragraph, unless the element is expressly recited using the phrase "means for."

What is claimed is:

1. A support platform, comprising:
    a lower plate;
    an upper plate movably attached to the lower plate; and
    a bladder disposed between the upper plate and the lower plate, the bladder being inflatable and deflatable under control of a controller in order to move the upper plate with respect to the lower plate through plural up and down cycles while a user is operating an input device on the platform, wherein
    at least one of: the upper plate, and lower plate, is rigid.
2. The support platform of claim 1, further comprising:
    a pump in fluid communication with the bladder.
3. The support platform of claim 2, further comprising:
    a bleed orifice in fluid communication with the bladder.
4. The support platform of claim 2, further comprising:
    a controller electrically connected to the pump.
5. The support platform of claim 4, wherein the controller periodically energizes and de-energizes the pump.
6. The support platform of claim 1, wherein the support platform is attached to an articulated arm extending from a desk.
7. The support platform of claim 6, wherein the support platform is laterally movable with respect to the desk.
8. The support platform of claim 1, further comprising:
    at least one of: a keyboard, and a mouse disposed on the support platform.
9. The support platform of claim 1, wherein the bladder is movable within the support platform.
10. The support platform of claim 1, wherein the upper plate is pivotably attached to the lower plate.
11. The support platform of claim 1, wherein the platform defines a front edge and a rear edge relative to a user, and the bladder is disposed closer to the front edge than the rear edge.
12. The system of claim 1, wherein the controller includes:
    means for displaying a support platform settings button;
    means for displaying a menu of at least one user definable support platform setting when the support platform settings button is selected; and
    means for allowing a user to define the value of the at least one user definable support platform setting.
13. The support platform of claim 12, wherein the user definable support platform setting is bladder inflation time.
14. The support platform of claim 12, wherein the user definable support platform setting is bladder deflation time.
15. The support platform of claim 12, wherein the user definable support platform setting is platform distance up.
16. The support platform of claim 12, wherein the user definable support platform setting is platform distance down.
17. The support platform of claim 12, wherein the user definable support platform setting is total range of platform motion.
18. The support platform of claim 12, wherein the user definable support platform setting is static time at top of motion.
19. The support platform of claim 12, wherein the user definable support platform setting is static time at bottom of motion.
20. The support platform of claim 12, wherein the user definable support platform setting is static time at middle of motion.
21. The support platform of claim 1, wherein the controller includes:
    means for halting the motion of the support platform at least partially based on an activation of a screen saver.
22. The support platform of claim 21, wherein the controller includes:
    means for restarting the motion of the support platform at least partially based on a deactivation of the screen saver.

* * * * *